United States Patent
Chien et al.

(10) Patent No.: US 8,988,512 B2
(45) Date of Patent: Mar. 24, 2015

(54) METHOD FOR ADJUSTING PLAYBACK OF MULTIMEDIA CONTENT ACCORDING TO DETECTION RESULT OF USER STATUS AND RELATED APPARATUS THEREOF

(75) Inventors: Min-Hung Chien, Taichung (TW); Po-Kai Fang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 455 days.

(21) Appl. No.: 13/087,349

(22) Filed: Apr. 14, 2011

(65) Prior Publication Data

US 2012/0262555 A1 Oct. 18, 2012

(51) Int. Cl.
*H04N 13/04* (2006.01)
*H04N 21/442* (2011.01)
*H04N 21/44* (2011.01)
*H04N 21/4402* (2011.01)
*H04N 21/81* (2011.01)

(52) U.S. Cl.
CPC ... *H04N 21/44218* (2013.01); *H04N 21/44008* (2013.01); *H04N 21/4402* (2013.01); *H04N 21/816* (2013.01); *H04N 13/0468* (2013.01); *H04N 13/0477* (2013.01); *H04N 13/0484* (2013.01); *H04N 2213/006* (2013.01)
USPC ............ 348/51; 348/42; 348/52; 348/53; 348/54; 348/55; 348/56; 348/57; 348/59; 348/60

(58) Field of Classification Search
CPC ............ H04N 19/0009; H04N 19/00096; H04N 19/00139; H04N 19/00145; H04N 19/0026; H04N 19/00278; H04N 19/00296; H04N 19/00545; H04N 19/00781; H04N 19/00884; H04N 13/0468; H04N 13/0477; H04N 13/0484; H04N 21/44008; H04N 21/4402; H04N 21/44218; H04N 21/816; H04N 2213/0006; H04N 13/0497; H04N 13/0404; H04N 13/0422; H04N 13/0402; H04N 13/0429; H04N 13/0434; H04N 13/0232; H04N 13/0431; G02B 27/2214
USPC ........................................................... 348/51
See application file for complete search history.

(56) References Cited

U.S. PATENT DOCUMENTS 5,287,437 A 2/1994 Deering
6,266,106 B1 * 7/2001 Murata et al. ................... 349/15

(Continued)

FOREIGN PATENT DOCUMENTS

CN 101742096 A 6/2010
CN 101931823 A 12/2010

*Primary Examiner* — Andy Rao
*Assistant Examiner* — Shan Elahi
(74) *Attorney, Agent, or Firm* — Winston Hsu; Scott Margo

(57) ABSTRACT

A playback method of a multimedia content includes: receiving the multimedia content; performing playback upon the multimedia content; detecting a user status and accordingly generating a detection result; and adjusting the playback of the multimedia content when the detection result indicates a change of the user status. A playback apparatus of a multimedia content includes a receiving block, a playback block, and a detecting block. The receiving block is used for receiving the multimedia content. The playback block is coupled to the receiving block, and used for performing playback upon the multimedia content. The detecting block is coupled to the playback block, and used for detecting a user status and accordingly generating a detection result. The playback block adjusts the playback of the multimedia content when the detection result indicates a change of the user status.

28 Claims, 12 Drawing Sheets

(56) References Cited

U.S. PATENT DOCUMENTS

| | | | |
|---|---|---|---|
| 6,421,259 B1* | 7/2002 | Brooks et al. | 363/84 |
| 6,590,983 B1* | 7/2003 | Kraemer | 381/17 |
| 7,027,620 B2* | 4/2006 | Martinez | 382/118 |
| 7,127,081 B1* | 10/2006 | Erdem | 382/103 |
| 7,428,000 B2* | 9/2008 | Cutler et al. | 348/14.11 |
| 7,643,683 B2* | 1/2010 | Miller | 382/190 |
| 8,249,310 B2* | 8/2012 | Okubo | 382/118 |
| 8,253,797 B1* | 8/2012 | Maali et al. | 348/143 |
| 8,274,592 B2* | 9/2012 | Watkins et al. | 348/333.02 |
| 8,331,023 B2* | 12/2012 | Wu et al. | 359/464 |
| 8,442,244 B1* | 5/2013 | Long, Jr. | 381/307 |
| 8,451,352 B2* | 5/2013 | Hayasaka et al. | 348/267 |
| 2001/0010508 A1* | 8/2001 | Kakeya | 345/9 |
| 2002/0150280 A1* | 10/2002 | Li | 382/117 |
| 2003/0123713 A1* | 7/2003 | Geng | 382/118 |
| 2004/0263636 A1* | 12/2004 | Cutler et al. | 348/211.12 |
| 2005/0041738 A1* | 2/2005 | Lin et al. | 375/240.03 |
| 2005/0144284 A1* | 6/2005 | Ludwig et al. | 709/226 |
| 2006/0187305 A1* | 8/2006 | Trivedi et al. | 348/169 |
| 2006/0203085 A1* | 9/2006 | Tomita | 348/51 |
| 2007/0035628 A1* | 2/2007 | Kanai | 348/159 |
| 2008/0025558 A1* | 1/2008 | Nozawa | 382/100 |
| 2008/0278587 A1* | 11/2008 | Izawa | 348/207.11 |
| 2008/0309796 A1* | 12/2008 | Abe | 348/231.99 |
| 2009/0046139 A1* | 2/2009 | Cutler et al. | 348/14.08 |
| 2009/0060290 A1* | 3/2009 | Sabe et al. | 382/118 |
| 2009/0087016 A1* | 4/2009 | Berestov et al. | 382/100 |
| 2010/0245287 A1* | 9/2010 | Thorn | 345/175 |
| 2010/0295925 A1* | 11/2010 | Maier | 348/47 |
| 2011/0084893 A1* | 4/2011 | Lee et al. | 345/6 |

* cited by examiner

METHOD FOR ADJUSTING PLAYBACK OF MULTIMEDIA CONTENT ACCORDING TO DETECTION RESULT OF USER STATUS AND RELATED APPARATUS THEREOF

BACKGROUND

The disclosed embodiments of the present invention relate to playback of multimedia data, and more particularly, to a method of adjusting playback of a multimedia content according to detection result of a user status and related apparatus thereof.

The conventional two-dimensional (2D) display is to present a single frame to both eyes of a user. Recently, with the development of science and technology, users are pursing stereoscopic and more real image displays rather than high quality images. Therefore, three-dimensional (3D) display is proposed to make user's left eye and right eye see different frames such that user's brain will regard the different frames seen from two eyes as a stereoscopic image. However, the user has to manually control the 2D/3D video playback setting to meet his/her preferred viewing preference. Similarly, regarding the audio playback, the user has to manually control the audio playback setting to meet his/her preferred listening preference. Thus, the user may desire to have improved viewing experience of the video content and/or improved listening experience of the audio content. An innovative playback scheme which can properly and automatically adjust the playback of a multimedia content, including a video content and/or an audio content, is needed.

SUMMARY

In accordance with exemplary embodiments of the present invention, a method of adjusting playback of a multimedia content according to detection result of a user status and related apparatus thereof are proposed to solve the above-mentioned problem.

According to a first aspect of the present invention, an exemplary playback method of a multimedia content is disclosed. The exemplary playback method includes receiving the multimedia content, performing playback upon the multimedia content, detecting a user status and accordingly generating a detection result, and adjusting the playback of the multimedia content when the detection result indicates a change of the user status.

According to a second aspect of the present invention, an exemplary playback apparatus of a multimedia content is disclosed. The exemplary playback apparatus includes a receiving block, a playback block, and a detecting block. The receiving block is used for receiving the multimedia content. The playback block is coupled to the receiving block, and used for performing playback upon the multimedia content. The detecting block is coupled to the playback block, and used for detecting a user status and accordingly generating a detection result. The playback block adjusts the playback of the multimedia content when the detection result indicates a change of the user status.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main conception of the present invention is to properly and automatically adjust the playback of a multimedia content, including a video content and/or an audio content, by monitoring the status of the user during the playback of the multimedia content. For example, when the status of the user is changed, a detection result of the user status, such as user's face angle or user's face location/user's location, would serve as a control signal to properly adjust the playback of the multimedia content. In this way, as no user intervention is involved in the playback control of the multimedia content, the user may have improved viewing/listening experience of the playback of the multimedia content. Further details are described as follows.

Figure 1:
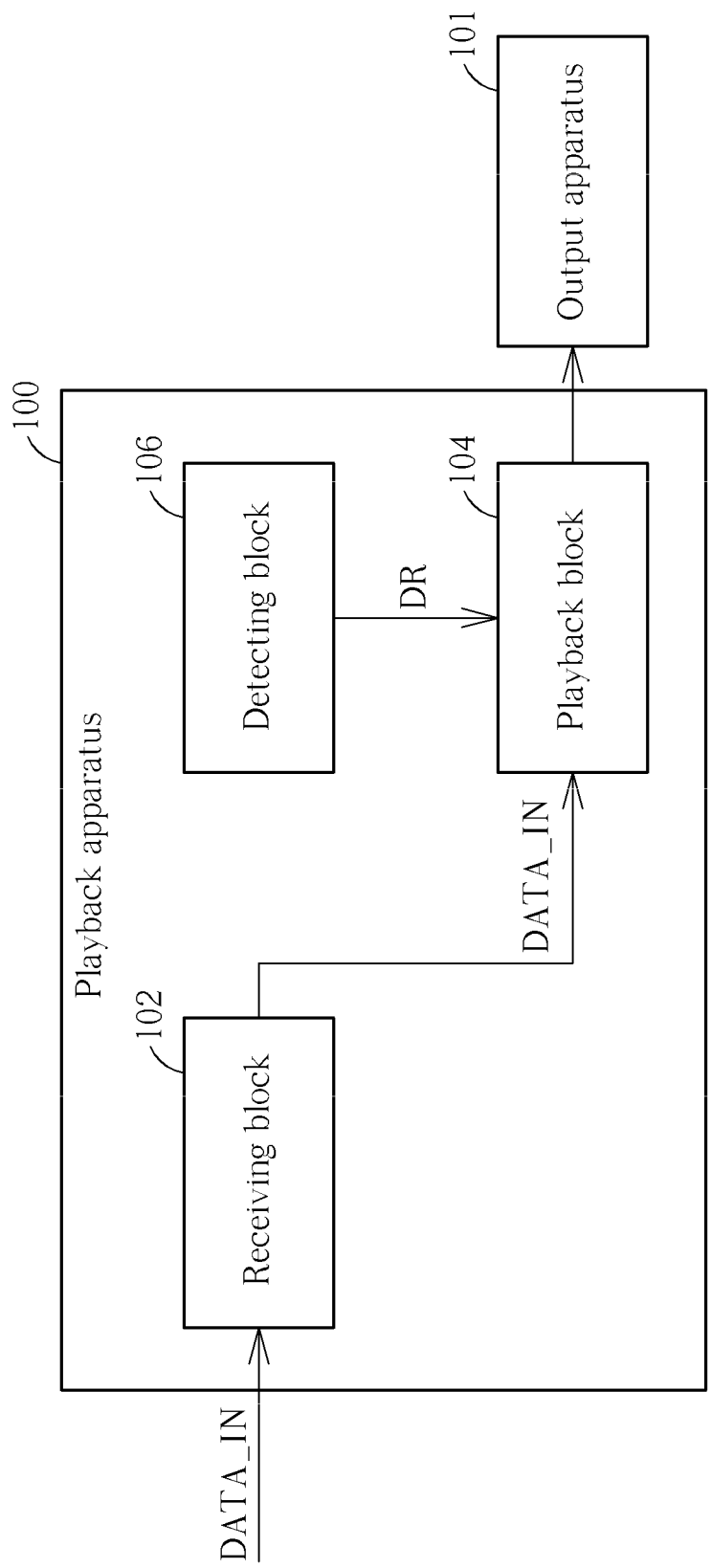
FIG. 1 is a block diagram illustrating a generalized playback apparatus of a multimedia content according to an exemplary embodiment of the present invention.

FIG. 1 is a block diagram illustrating a generalized playback apparatus of a multimedia content according to an exemplary embodiment of the present invention. The exemplary playback apparatus 100 includes, but is not limited to, a receiving block 102, a playback block 104, and a detecting block 106. The receiving block 102 is arranged to receive the multimedia content DATA_IN. The playback block 104 is coupled to the receiving block 102, and implemented for performing playback upon the multimedia content DATA_IN by driving an output apparatus 101. The detecting block 106 is coupled to the playback block 104, and implemented for detecting a user status and accordingly generating a detection result DR indicative of the detected user status. The detection result DR generated from the detecting block 106 is transmitted to the playback block 104. In this exemplary embodiment, the playback block 104 adjusts the playback of the multimedia content DATA_IN when the detection result DR indicates a change of the user status. For example, when the user has a first viewing/listening status, the output apparatus 101 presents a first playback result of video/audio information derived from the multimedia content DATA_IN, and when the user has a second viewing/listening status, the output apparatus 101 presents a second playback result of video/audio information derived from the multimedia content DATA_IN. In this way, the playback apparatus 100 is capable of automatically adjusting the playback of the multimedia content DATA_IN to satisfy the viewing/listening requirements of the user who may have different viewing/listening statuses during the playback of the multimedia content DATA_IN. Detailed technical features of the playback apparatus 100 will be illustrated with several exemplary implementations based on the structure shown in FIG. 1.

Figure 2:
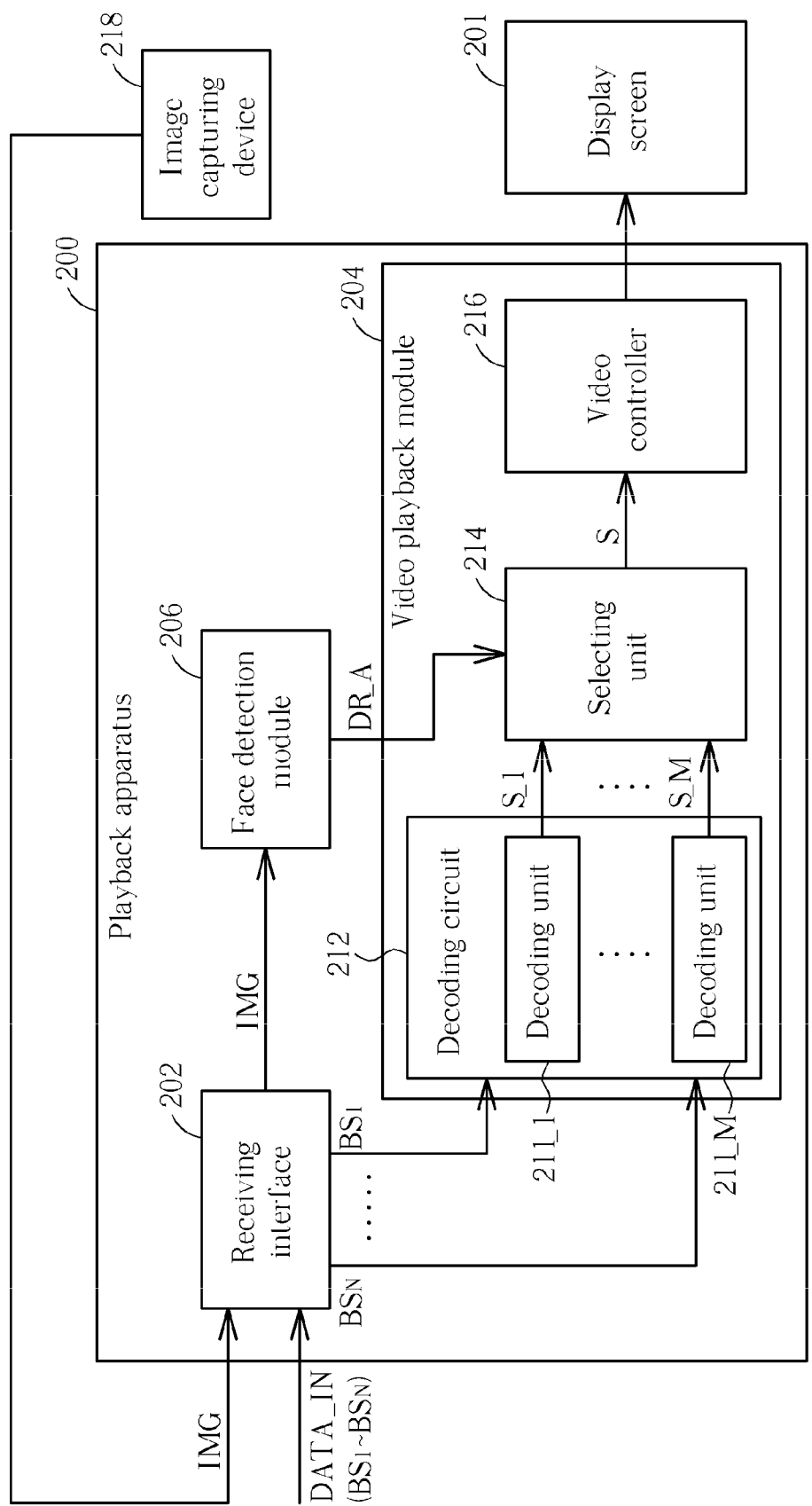
FIG. 2 is a block diagram illustrating a first exemplary implementation of the playback apparatus according to the present invention.

Please refer to FIG. 2, which is a block diagram illustrating a first exemplary implementation of the playback apparatus according to the present invention. The exemplary playback apparatus 200 includes, but is not limited to, a receiving interface 202, a video playback module 204, and a face detection module 206. Please note that the configuration of the playback apparatus 200 is based on the playback apparatus structure shown in FIG. 1. For example, the output apparatus 101 shown in FIG. 1 is realized by a display screen 201, the receiving block 102 shown in FIG. 1 is realized by the receiving interface 202 shown in FIG. 2, the detecting block 106 shown in FIG. 1 is realized by the face detection module 206, and the playback block 104 shown in FIG. 1 is realized by the video playback module 204. In this exemplary implementation, the multimedia content DATA_IN includes a plurality of video bitstreams $BS_1$-$BS_N$ corresponding to different view angles, respectively. By way of example, but not limitations, the multimedia content DATA_IN includes video data of a soccer game, where the video bitstreams $BS_1$-$BS_N$, such as BS_1-BS_5 shown in FIG. 3, correspond to different view angles A1-A5 of the soccer court. Therefore, events of the soccer game may be recorded in the video bitstreams BS_1-BS_5. For example, corner kicking events are preferably recorded by the video bitstreams BS_2 and BS_4, the shooting events are preferably recorded by the video bitstreams BS_1 and BS_5, and the kick-off/passing events are preferably recorded by the video bitstream BS_3.

The video bitstreams $BS_1$-$BS_N$ received by the receiving interface 202 are transmitted to the video playback module 204 for further processing. As shown in FIG. 2, the video playback module 204 includes, but is not limited to, a decoding circuit 212, a selecting circuit 214, and a video controller 216, wherein the decoding circuit 212 includes a plurality of decoding units 211_1-211_M. Please note that the number of the decoding units 211_1-211_M may be equal to or smaller than the number of the video bitstreams $BS_1$-$BS_N$, depending upon the actual design requirement/consideration. In a case where the number of the decoding units 211_1-211_M is equal to the number of the video bitstreams $BS_1$-$BS_N$, the decoding units 211_1-211_M are therefore arranged to decode the video bitstreams $BS_1$-$BS_N$, respectively and concurrently. In another case where the number of the decoding units 211_1-211_M is smaller than the number of the video bitstreams $BS_1$-$BS_N$, the decoding units 211_1-211_M are therefore arranged to decode some video bitstreams selected from the video bitstreams $BS_1$-$BS_N$, respectively and concurrently. Frames generated from decoding the video bitstreams are transmitted from the decoding circuit 212 to the selecting circuit 214. The selecting circuit 214 selects one of the outputs S_1-S_M generated from the decoding units 211_1-211_M according to a detection result DR_A generated from the face detection module 206, and transmits a selected output S to the video controller 216. Next, the video controller 216 drives the display screen 201 to display frames of the selected output S.

In this exemplary implementation, the above-mentioned user status is user's face angle. Therefore, the receiving interface 202 further receives a captured image IMG generated from an image capturing device (e.g., a video camera) 218. For example, the image capturing device 218 and the display screen 201 may be disposed in the same display apparatus (e.g., a television). The face detection module 206 detects the user status (i.e., user's face angle) by performing a face detection upon the captured image IMG. When the detection result DR_A indicates that user's face angle is changed, the selecting circuit 214 changes the selected output S by selecting another one of the outputs S_1-S_M as its output.

To put it simply, when user's face corresponds to a first angle, the video playback module 204 controls the display screen 201 to display frames of a first video bitstream corresponding to a first view angle, and when user's face corresponds to a second angle (i.e., the user's face angle is changed), the video playback module 204 controls the display screen 201 to display frames of a second video bitstream corresponding to a second view angle which is different from the first view angle.

Figure 3:
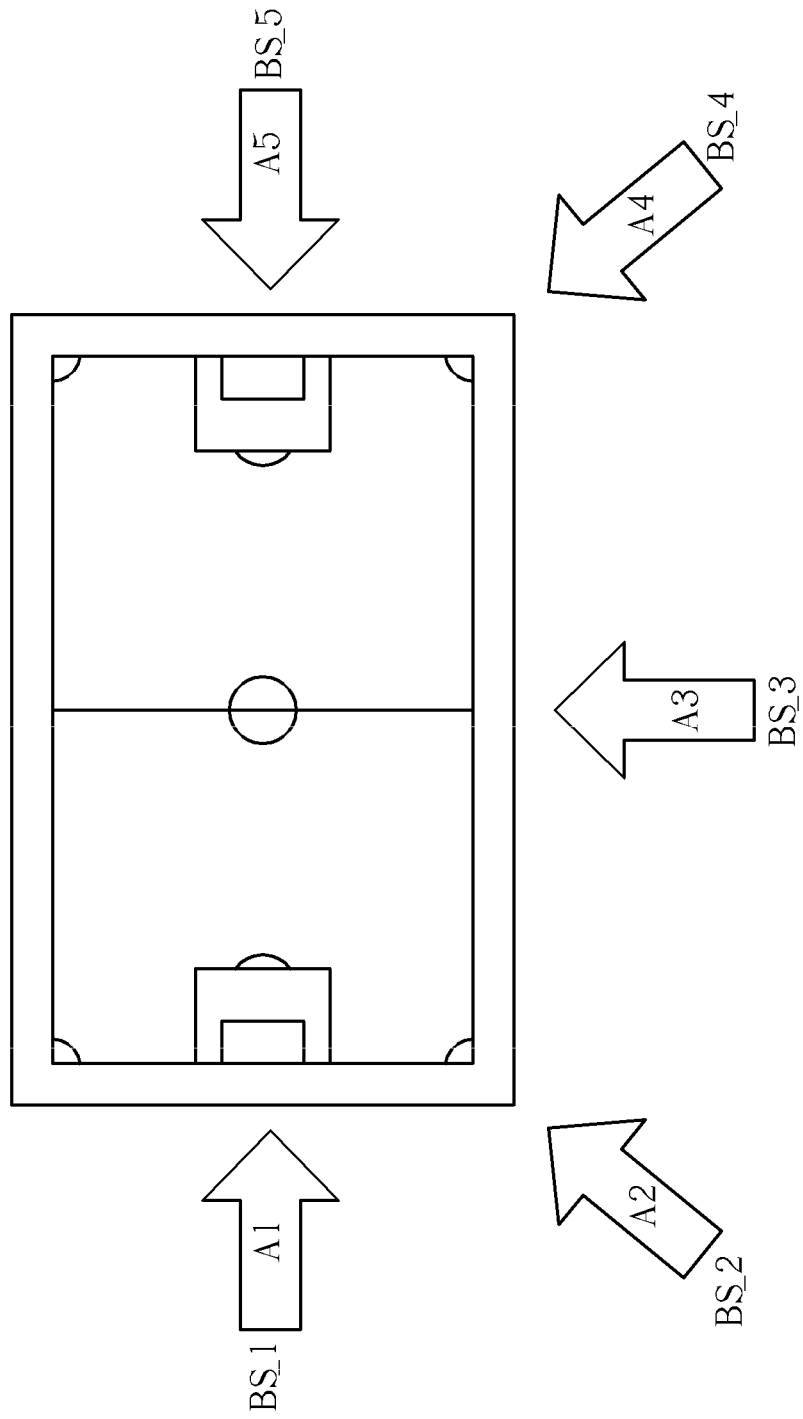
FIG. 3 is a diagram illustrating video bitstreams corresponding to different view angles of a soccer court.
Figure 4:
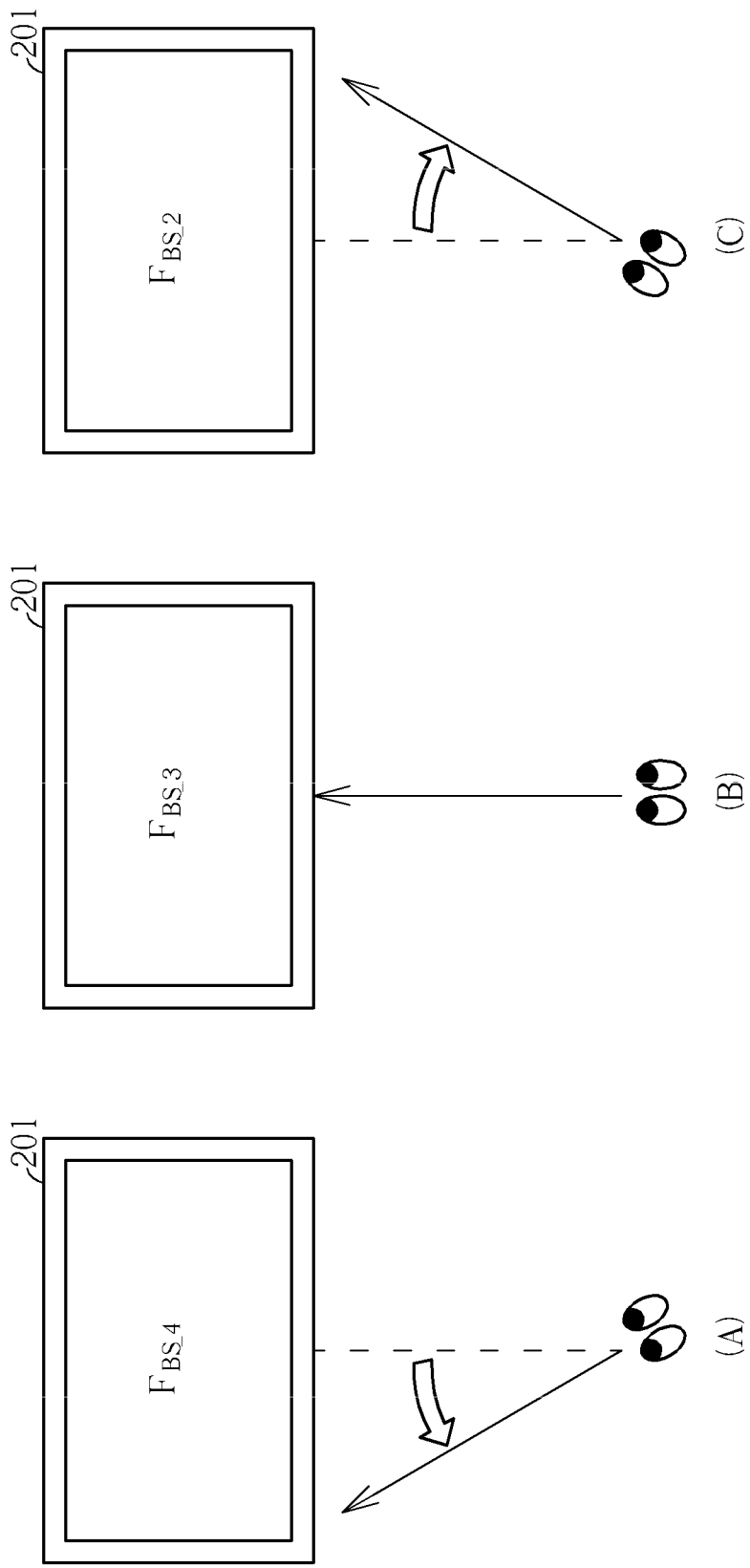
FIG. 4 is a diagram illustrating the operation of automatically adjusting playback of the multimedia content by using the playback apparatus shown in FIG. 2.

Please refer to FIG. 3 in conjunction with FIG. 4. FIG. 4 is a diagram illustrating the operation of automatically adjusting playback of the multimedia content by using the playback apparatus 200 shown in FIG. 2. When the user is viewing the display screen 201 with a normal view angle identical to or close to the view angle A3 shown in FIG. 3, the video playback module 204 drives the display screen 201 to display frames $F_{BS\_3}$ corresponding to the video bitstream BS_3, as shown in the sub-diagram (B) in FIG. 4. When the user wants to view events happening at the right corner of the soccer court, the user turns his face counterclockwise, as shown in the sub-diagram (A) in FIG. 4. As the user's face angle is identical to or close to the view angle A4 shown in FIG. 3, the video playback module 204 automatically adjusts the video playback by driving the display screen 201 to display frames $F_{BS\_4}$ corresponding to the video bitstream BS_4 in response to the detection result DR_A which indicates the counterclockwise change of the user's face angle. When the user wants to view events happening at the left corner of the soccer court, the user turns his face clockwise, as shown in the sub-diagram (C) in FIG. 4. As the user's face angle is identical to or close to the view angle A2 shown in FIG. 3, the video playback module 204 automatically adjusts the video playback by driving the display screen 201 to display frames $F_{BS\_2}$ corresponding to the video bitstream BS_2 in response to the detection result DR_A which indicates the clockwise change of the user's face angle. Please note that the example shown in FIG. 4 is for illustrative purposes only, and is not meant to be a limitation of the present invention. The spirit of the present invention is obeyed as long as the playback of the multimedia content is automatically adjusted in response to the detection result which indicates a change of user's face angle.

Figure 5:
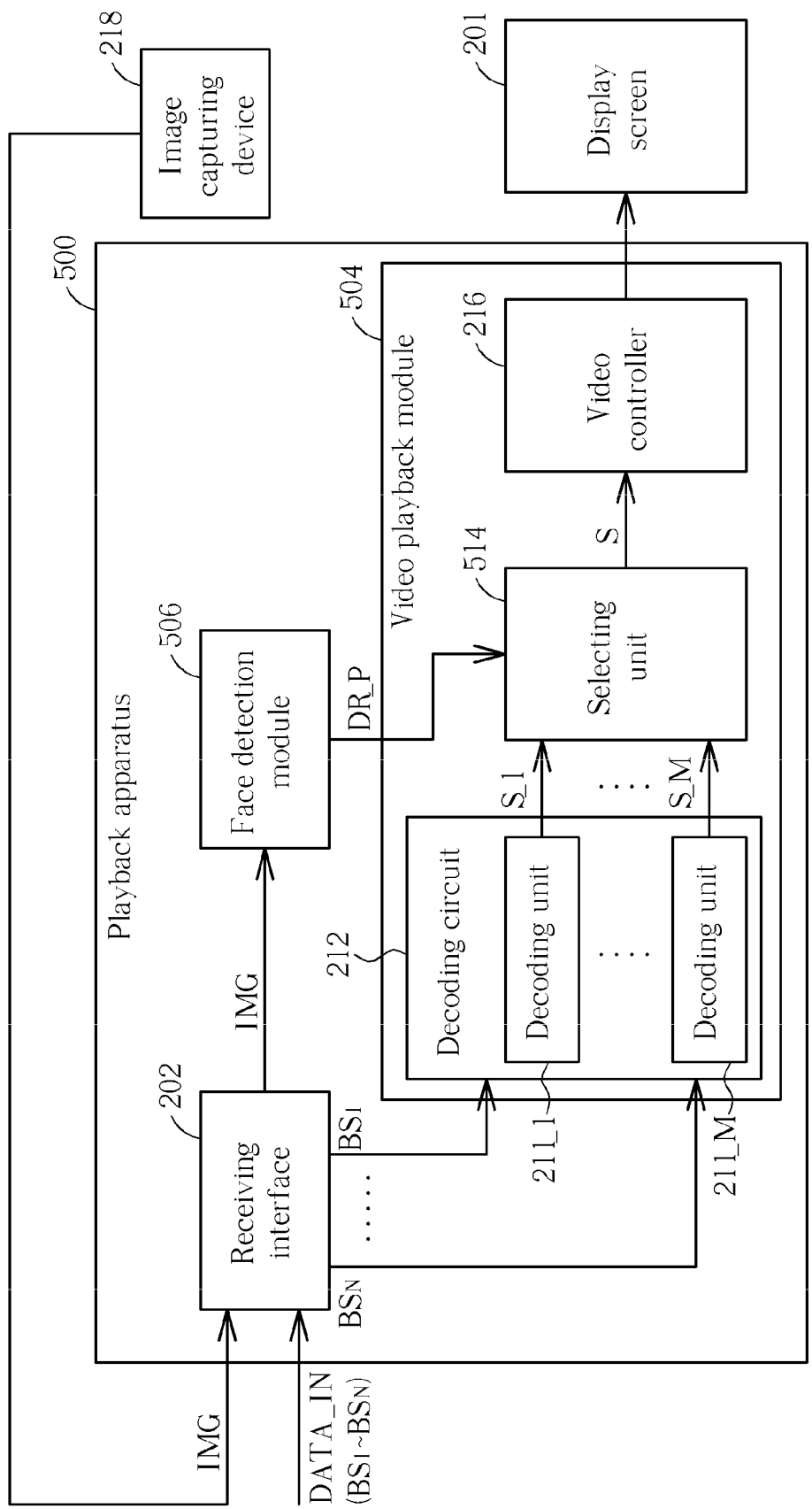
FIG. 5 is a block diagram illustrating a second exemplary implementation of the playback apparatus according to the present invention.

Please refer to FIG. 5, which is a block diagram illustrating a second exemplary implementation of the playback apparatus according to the present invention. The configuration of the exemplary playback apparatus 500 shown in FIG. 5 is similar to that of the playback apparatus 200 shown in FIG. 2. The major difference is that user's status to be monitored by the face detection module 506 is user's face location (i.e., user's location) instead of user's face angle. Thus, the face detection module 506 generates a detection result DR_P indicative of user's face location to the selecting circuit 514. When the detection result DR_P indicates that user's face location is changed (i.e., user's location is changed), the selecting circuit 514 changes the selected output S by switching its output from one of the outputs S_1-S_M to another one of the outputs S_1-S_M.

To put it simply, when user's face corresponds to a first location, the video playback module 504 controls the display screen 201 to display frames of a first video bitstream corresponding to a first view angle, and when user's face corresponds to a second location (i.e., the user's face location is changed), the video playback module 504 controls the display screen 201 to display frames of a second video bitstream corresponding to a second view angle which is different from the first view angle.

Figure 6:
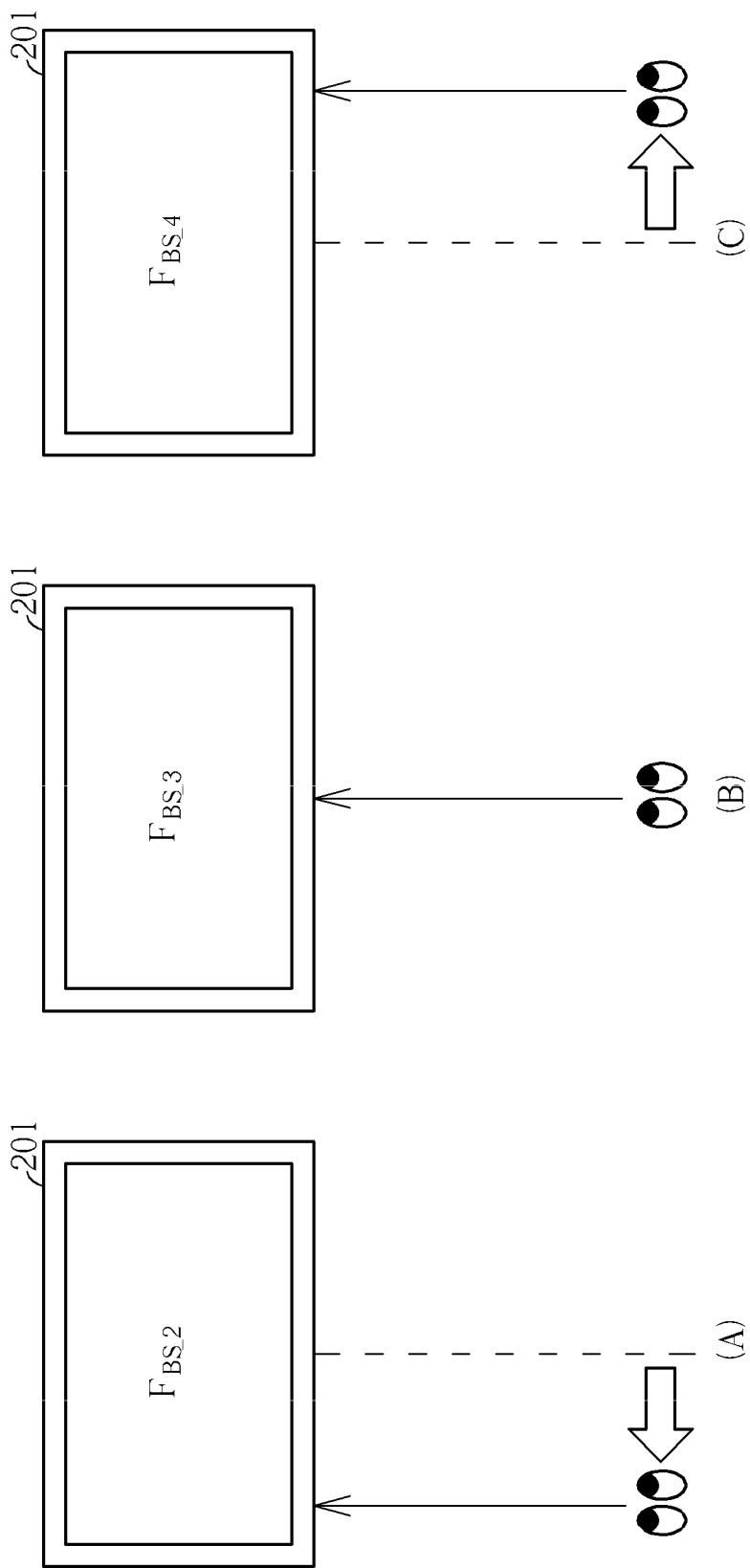
FIG. 6 is a diagram illustrating the operation of automatically adjusting playback of the multimedia content by using the playback apparatus shown in FIG. 5.

Please refer to FIG. 3 in conjunction with FIG. 6. FIG. 6 is a diagram illustrating the operation of automatically adjusting playback of the multimedia content by using the playback apparatus 500 shown in FIG. 5. When the user is at a specific location for viewing the display screen 201 with a normal view angle identical to or close to the view angle A3 shown in FIG. 3, the video playback module 504 drives the display screen 201 to display frames $F_{BS\_3}$ corresponding to the video bitstream BS_3, as shown in the sub-diagram (B) in FIG. 6. When the user wants to view events happening at the left corner of the soccer court, the user moves leftwards to a new location, as shown in the sub-diagram (A) in FIG. 6. The video playback module 504 automatically adjusts the video playback by driving the display screen 201 to display frames $F_{BS\_2}$ corresponding to the video bitstream BS_2 in response to the detection result DR_A which indicates the leftward change of the user's face location. When the user wants to view events happening at the right corner of the soccer court, the user moves rightwards to a new location, as shown in the sub-diagram (C) in FIG. 6. The video playback module 504 automatically adjusts the video playback by driving the display screen 201 to display frames $F_{BS\_4}$ corresponding to the video bitstream BS_4 in response to the detection result DR_A which indicates the rightward change of the user's face location. Please note that the example shown in FIG. 6 is for illustrative purposes only, and is not meant to be a limitation of the present invention. The spirit of the present invention is obeyed as long as the playback of the multimedia content is automatically adjusted in response to the detection result which indicates a change of user's face location (i.e., a change of user's location).

Figure 7:
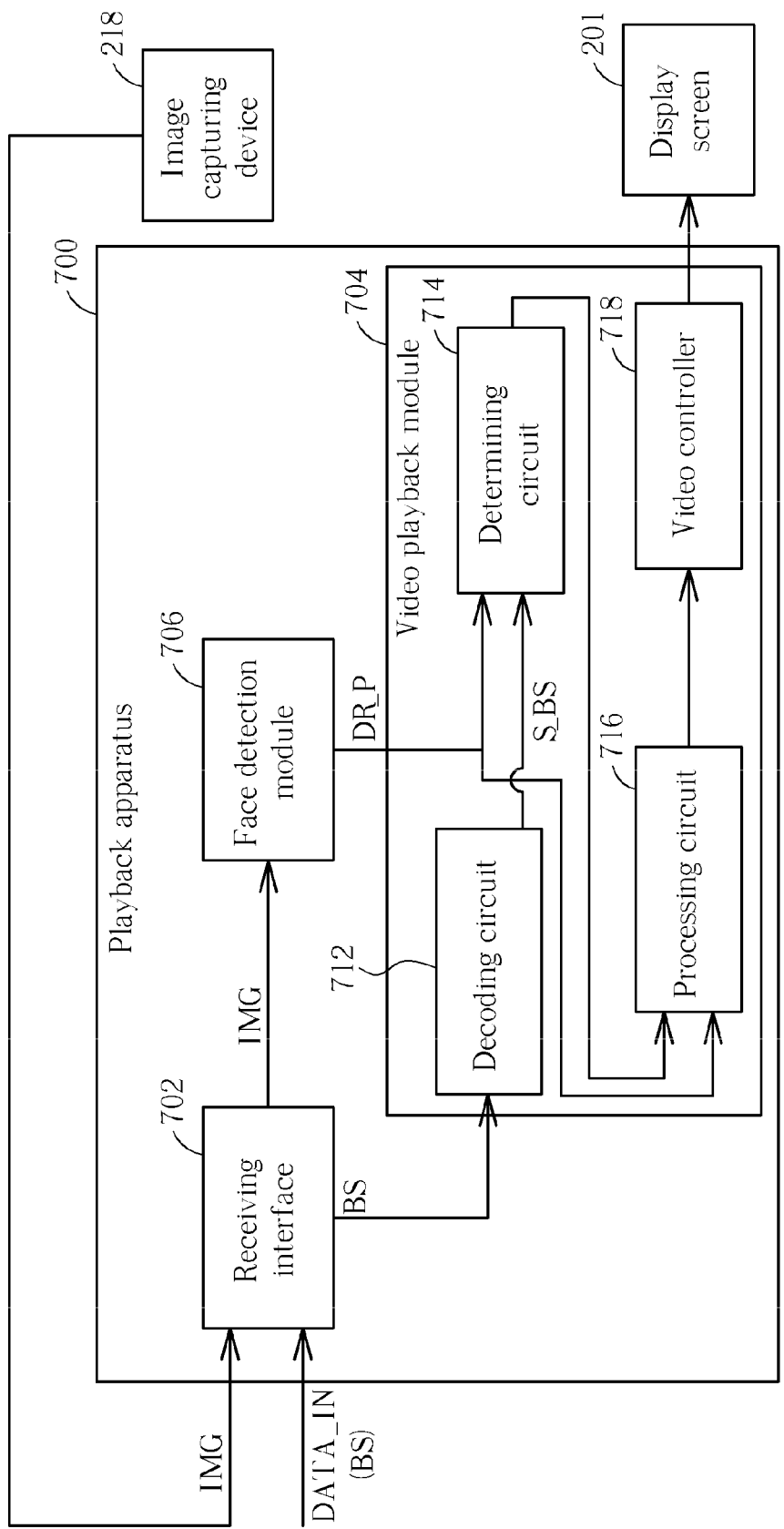
FIG. 7 is a block diagram illustrating a third exemplary implementation of the playback apparatus according to the present invention.

Please refer to FIG. 7, which is a block diagram illustrating a third exemplary implementation of the playback apparatus according to the present invention. The exemplary playback apparatus 700 includes, but is not limited to, a receiving interface 702, a video playback module 704, and a face detection module 706. Please note that the configuration of the playback apparatus 700 is based on the playback apparatus structure shown in FIG. 1. For example, the output apparatus 101 shown in FIG. 1 is realized by the display screen 201, the receiving block 102 shown in FIG. 1 is realized by the receiving interface 702 shown in FIG. 2, the detecting block 106 shown in FIG. 1 is realized by the face detection module 706, and the playback block 104 shown in FIG. 1 is realized by the video playback module 704. In this exemplary embodiment, the multimedia content DATA_IN includes at least one video bitstream BS. For example, the video bitstream BS may be one of the aforementioned video bitstreams $BS_1$-$BS_N$.

The video bitstream BS received by the receiving interface 702 is transmitted to the video playback module 704 for further processing. As shown in FIG. 7, the video playback module 704 includes, but is not limited to, a decoding circuit 712, a determining circuit 714, a processing circuit 716, and a video controller 718. Frames generated from decoding the video bitstream BS (i.e., an output S_BS of the decoding circuit 712) will be transmitted from the decoding circuit 712 to the determining circuit 714. The determining circuit 714 selects a partial image within each of the frames according to the detection result DR_P generated from the face detection module 706. The processing circuit 716 generates processed images by processing partial images of the frames according to a video effect setting, and then transmits the processed images to the video controller 718. Next, the video controller 718 drives the display screen 201 to display the processed images.

In this exemplary implementation, the above-mentioned user status is user's face location/user's location. Therefore, the receiving interface 702 further receives a captured image IMG generated from the aforementioned image capturing device (e.g., a video camera) 218. The operation of the face detection module 706 is identical to that of the face detection module 506 shown in FIG. 5. That is, the face detection module 706 detects the user status (e.g., user's face location) by performing a face detection upon the captured image IMG. When the detection result DR_P indicates that user's face location is changed, the determining circuit 714 may change the location of the partial image selected from each frame generated from the decoding circuit 712, and/or the processing circuit 716 may adjust the employed video effect setting.

For example, when it is judged that user's face corresponds to a first location due to the detection result DR_P transmitting a first indication value of the user's face location/user's location, the video playback module 704 selects a first partial image within each of first frames derived from the video bitstream BS according to the first indication value, generates first processed images by processing first partial images of the first frames according to a first video effect setting, and drives the display screen 201 according to the first processed images. When it is judged that user's face corresponds to a second location due to the detection result DR_P transmitting a second indication value of the user's face location/user's location, the video playback module 704 selects a second partial image within each of second frames derived from the video bitstream BS according to the second indication value, generates second processed images by processing second partial images of the second frames according to a second video effect setting which is different from the first video effect setting, and drives the display screen 201 according to the second processed images.

Figure 8:
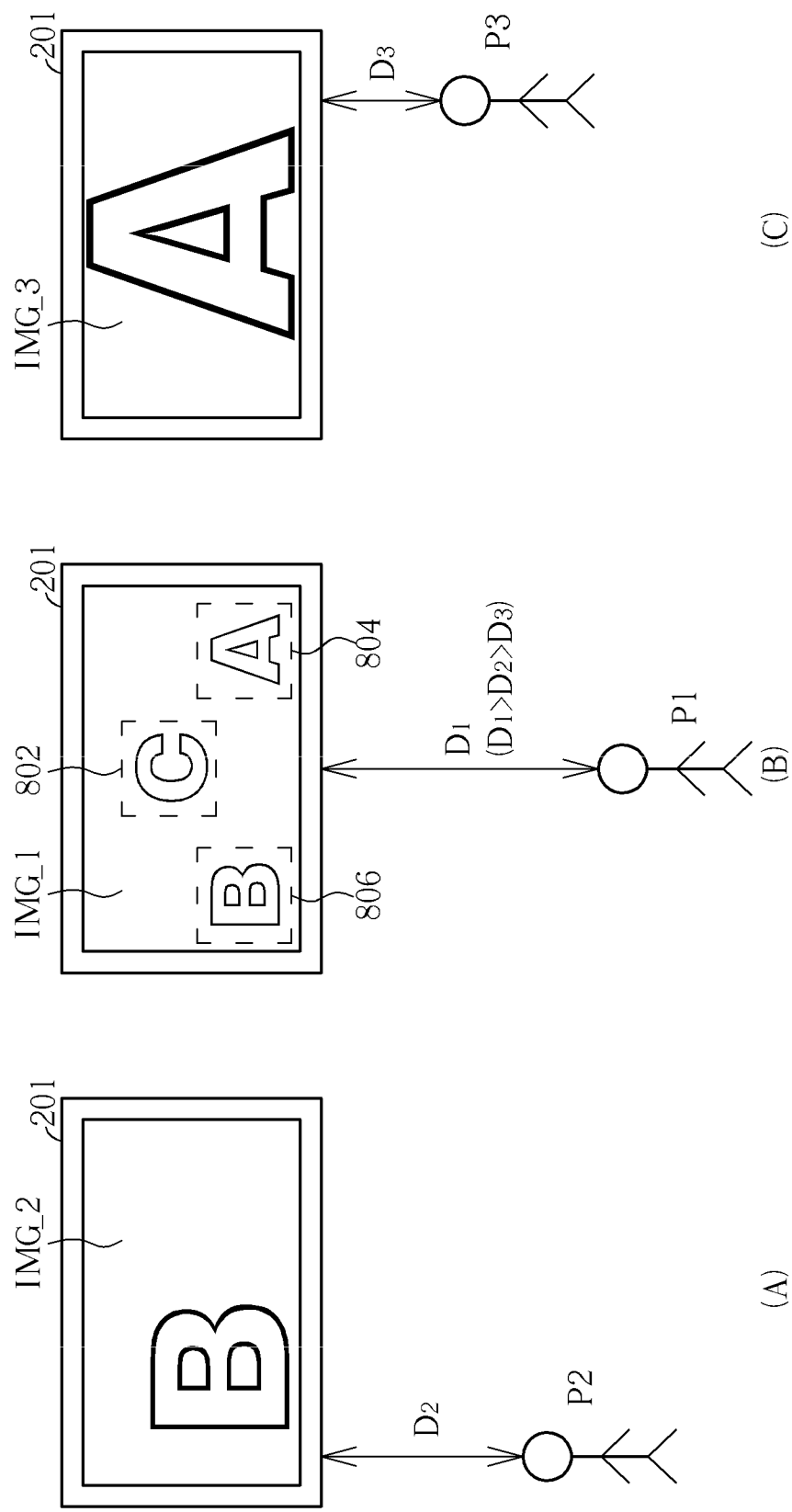
FIG. 8 is a diagram illustrating the operation of automatically adjusting playback of the multimedia content by using the playback apparatus shown in FIG. 7.

Please refer to FIG. 8, which is a diagram illustrating the operation of automatically adjusting playback of the multimedia content by using the playback apparatus 700 shown in FIG. 7. When the user is viewing the display screen 201 at a location P1, and user's face location is close to the display area 802 of the display screen 201, the video playback module 704 shows first processed images IMG_1 generated in response to a first zooming setting and a first indication value of the user's face location, as shown in the sub-diagram (B) in FIG. 8. When the user moves from the location P1 to a new location P2, user's face location is now close to the display area 806 of the display screen 201. Thus, the video playback module 704 shows second processed images IMG_2 generated in response to a second zooming setting and a second indication value of the user's face location, as shown in the sub-diagram (A) in FIG. 8. Specifically, the partial images in the display area 806 are selected due to the second indication value of the user's face location as indicated by the detection result DR_P, and then zoomed in by the zoom-in ratio defined in the second zooming setting. When the user moves from the location P1 to a new location P3, user's face location is now close to the display area 804 of the display screen 201. Thus, the video playback module 704 shows third processed images IMG_3 generated in response to a third zooming setting and a third indication value of the user's face location, as shown in the sub-diagram (C) in FIG. 8. Specifically, the partial images in the display area 804 are selected due to the third indication value of the user's face location as indicated by the detection result DR_P, and then zoomed in by the zoom-in ratio defined in the third zooming setting. Please note that the distances D1-D3 between the user and the display screen 201 are different from one another. In one exemplary design, the zooming settings would have different zoom-in/zoom-out ratios defined therein. For example, the first zooming setting has a zoom-in ratio smaller than that of the second zooming setting due to $D_1 > D_2$, and the second zooming setting has a zoom-in ratio smaller than that of the third zooming setting due to $D_2 > D_3$. However, this is for illustrative purposes only, and is not meant to be a limitation of the present invention. The spirit of the present invention is obeyed as long as the playback of the multimedia content is automatically adjusted in response to the detection result which indicates a change of user's face location/user's location.

Please note that the determining circuit 714 shown in FIG. 7 may be optional. That is, in another exemplary implementation, the determining circuit 714 may be omitted. Please refer to FIG. 9, which is a block diagram illustrating a fourth exemplary implementation of the playback apparatus according to the present invention. The major difference between the playback apparatuses 700 and 900 is that the playback apparatus 900 in FIG. 9 has no determining circuit implemented in the video playback module 904. Thus, the output S_BS of the decoding circuit 712 is fed into the processing circuit 916. In this exemplary implementation, the processing circuit 916 generates processed frames by processing frames of the video bitstream BS according to a video effect setting, and then transmits the processed frames to the video controller 718. Next, the video controller 718 drives the display screen 201 to display the processed frames. Please note that, when the detection result DR_P indicates that user's face location/user's location is changed, the processing circuit 916 may adjust the employed video effect setting to thereby adjust the video playback.

For example, when it is judged that user's face corresponds to a first location due to the detection result DR_P transmitting a first indication value of the user's face location, the video playback module 904 generates first processed frames by processing first frames of the video bitstream BS according to a first video effect setting, and drives the display screen 201 according to the first processed frames. When it is judged that user's face corresponds to a second location due to the detection result DR_P transmitting a second indication value of the user's face location, the video playback module 904 generates second processed frames by processing second frames of the video bitstream BS according to a second video effect setting which is different from the first video effect setting, and drives the display screen 201 according to the second processed frames. By way of example, but not limitation, the first video effect setting includes a first zooming setting, and the second video effect setting includes a second zooming setting.

Figure 9:
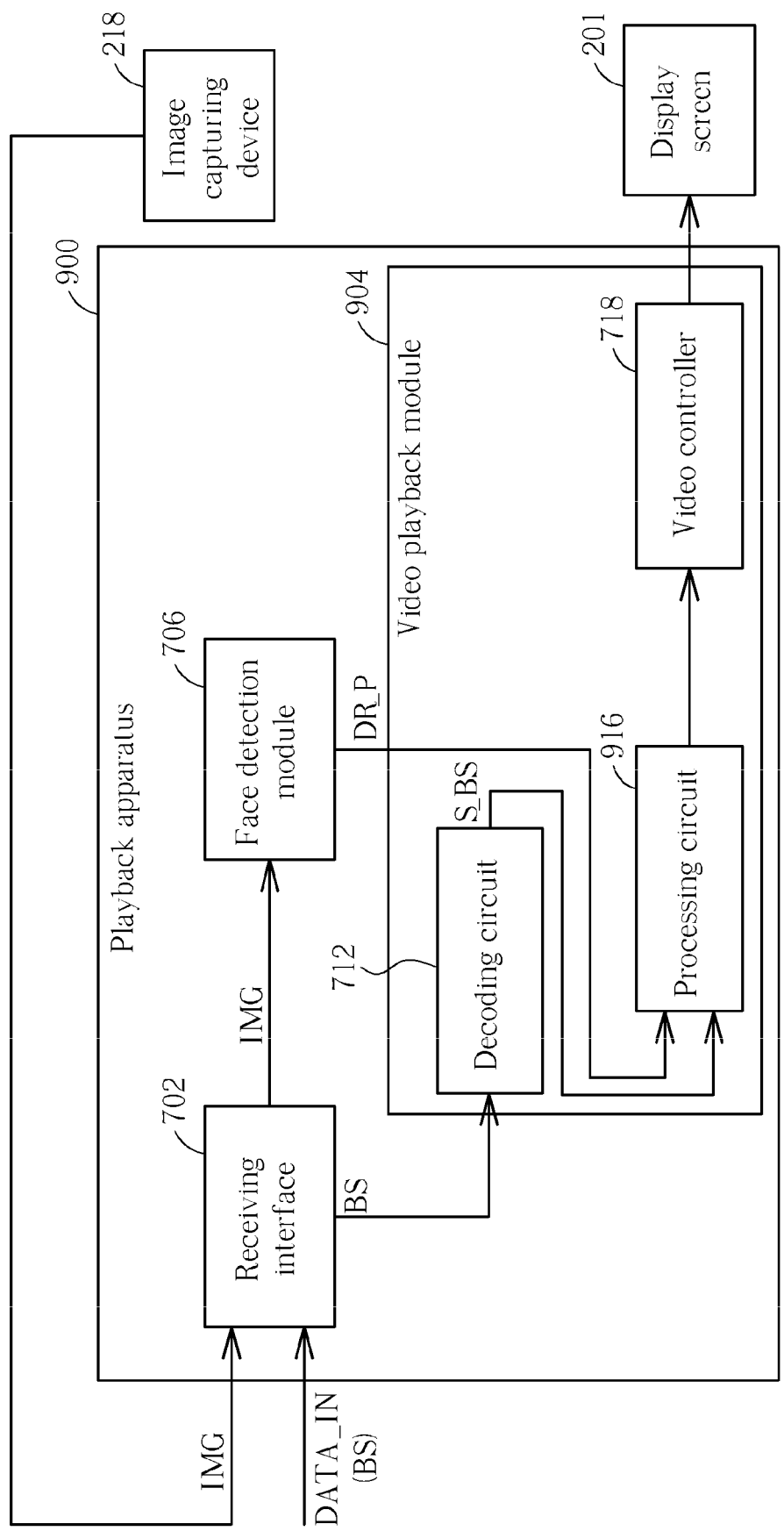
FIG. 9 is a block diagram illustrating a fourth exemplary implementation of the playback apparatus according to the present invention.
Figure 10:
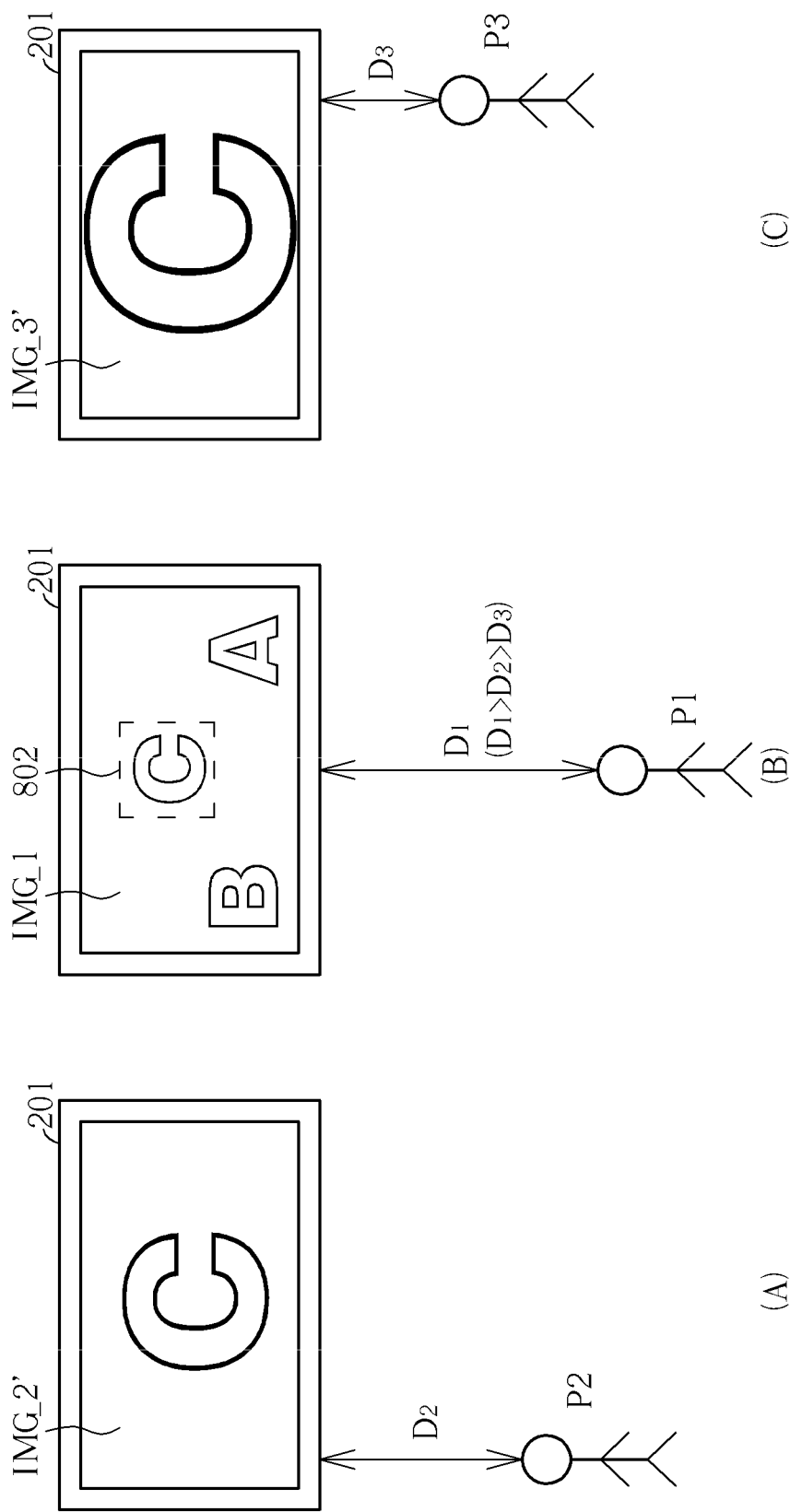
FIG. 10 is a diagram illustrating the operation of automatically adjusting playback of the multimedia content by using the playback apparatus shown in FIG. 9.

Please refer to FIG. 10, which is a diagram illustrating the operation of automatically adjusting playback of the multimedia content by using the playback apparatus 900 shown in FIG. 9. When the user is viewing the display screen 201 at a location P1, the video playback module 904 shows first processed images IMG_1 generated in response to a first zooming setting configured due to a first indication value of the user's face location, as shown in the sub-diagram (B) in FIG. 8. When the user moves from the location P1 to a new location P2, the video playback module 904 shows second processed images IMG_2' generated in response to a second zooming setting configured due to a second indication value of the user's face location, as shown in the sub-diagram (A) in FIG. 8. Specifically, the partial images in the center display area 802 are zoomed in by the zoom-in ratio defined in the second zooming setting. When the user moves from the location P1 to a new location P3, the video playback module 704 shows third processed images IMG_3' generated in response to a third zooming setting configured due to a third indication value of the user's face location, as shown in the sub-diagram (C) in FIG. 8. Specifically, the partial images in the center display area 802 are zoomed in by the zoom-in ratio defined in the third zooming setting. Please note that the distances D1-D3 between the user and the display screen 201 are different from one another. In one exemplary design, the zooming settings would have different zoom-in/zoom-out ratios defined therein. For example, the first zooming setting has a zoom-in ratio smaller than that of the second zooming setting due to $D_1 > D_2$, and the second zooming setting has a zoom-in ratio smaller than that of the third zooming setting due to $D_2 > D_3$. As can be readily known from FIG. 10, the partial images in the same center display area 802 are automatically zoomed in by proper zoom-in ratios regardless of user's face location/user's location. However, this is for illustrative purposes only, and is not meant to be a limitation of the present invention. The spirit of the present invention is obeyed as long as the playback of the multimedia content is automatically adjusted in response to the detection result which indicates a change of user's face location/user's location.

In addition to video playback control, the same conception may be applied to the audio playback control for improving user's listening experience. Please refer to FIG. 11, which is a block diagram illustrating a fifth exemplary implementation of the playback apparatus according to the present invention. The exemplary playback apparatus 1100 includes, but is not limited to, a receiving interface 1102, an audio playback module 1104, and a face detection module 1106. Please note that the configuration of the playback apparatus 1100 is based on the playback apparatus structure shown in FIG. 1. For example, the output apparatus 101 shown in FIG. 1 is realized by a speaker system 1101, the receiving block 102 shown in FIG. 1 is realized by the receiving interface 1102, the detecting block 106 shown in FIG. 1 is realized by the face detection module 1106, and the playback block 104 shown in FIG. 1 is realized by the audio playback module 1104. In this exemplary embodiment, the multimedia content DATA_IN includes an audio data $D_A$, such as an encoded/modulated audio input.

Figure 11:
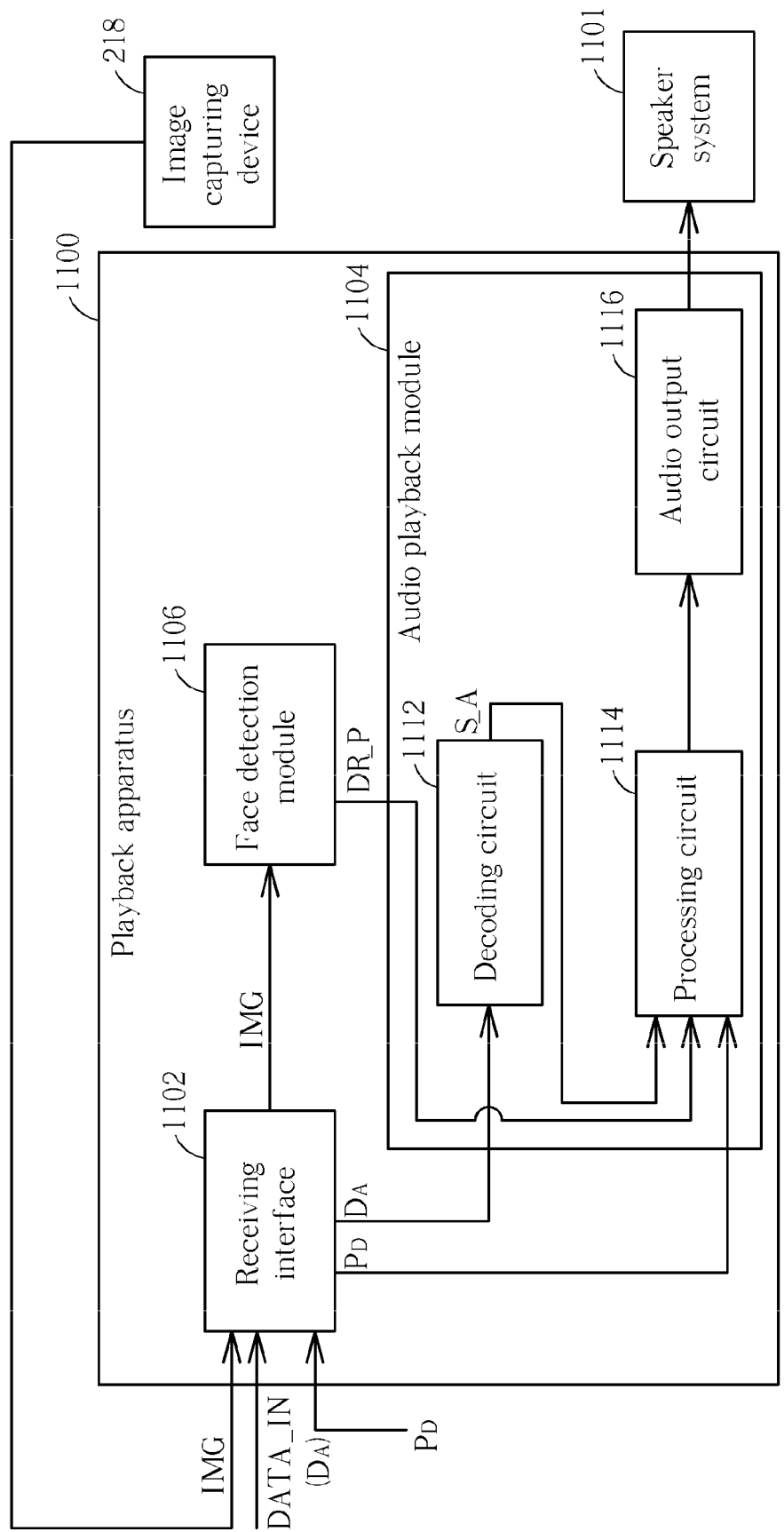
FIG. 11 is a block diagram illustrating a fifth exemplary implementation of the playback apparatus according to the present invention.

The audio data $D_A$ received by the receiving interface 1102 is transmitted to the audio playback module 1104 for further processing. As shown in FIG. 11, the audio playback module 1104 includes, but is not limited to, a decoding circuit 1112, a processing circuit 1114, and an audio output circuit 1116. Audio samples generated from decoding the audio data $D_A$ are transmitted from the decoding circuit 1112 to the processing circuit 1114. The processing circuit 1114 processes an output S_A of the decoding circuit 1112 according to an audio effect setting, and transmits the processed audio samples to the audio output circuit 1116. Next, the audio output circuit 1116 drives the speaker system 1101 to play the processed audio samples. Please note that the audio effect setting is configured according to a detection result DR_P generated from the face detection module 1106.

Figure 12:
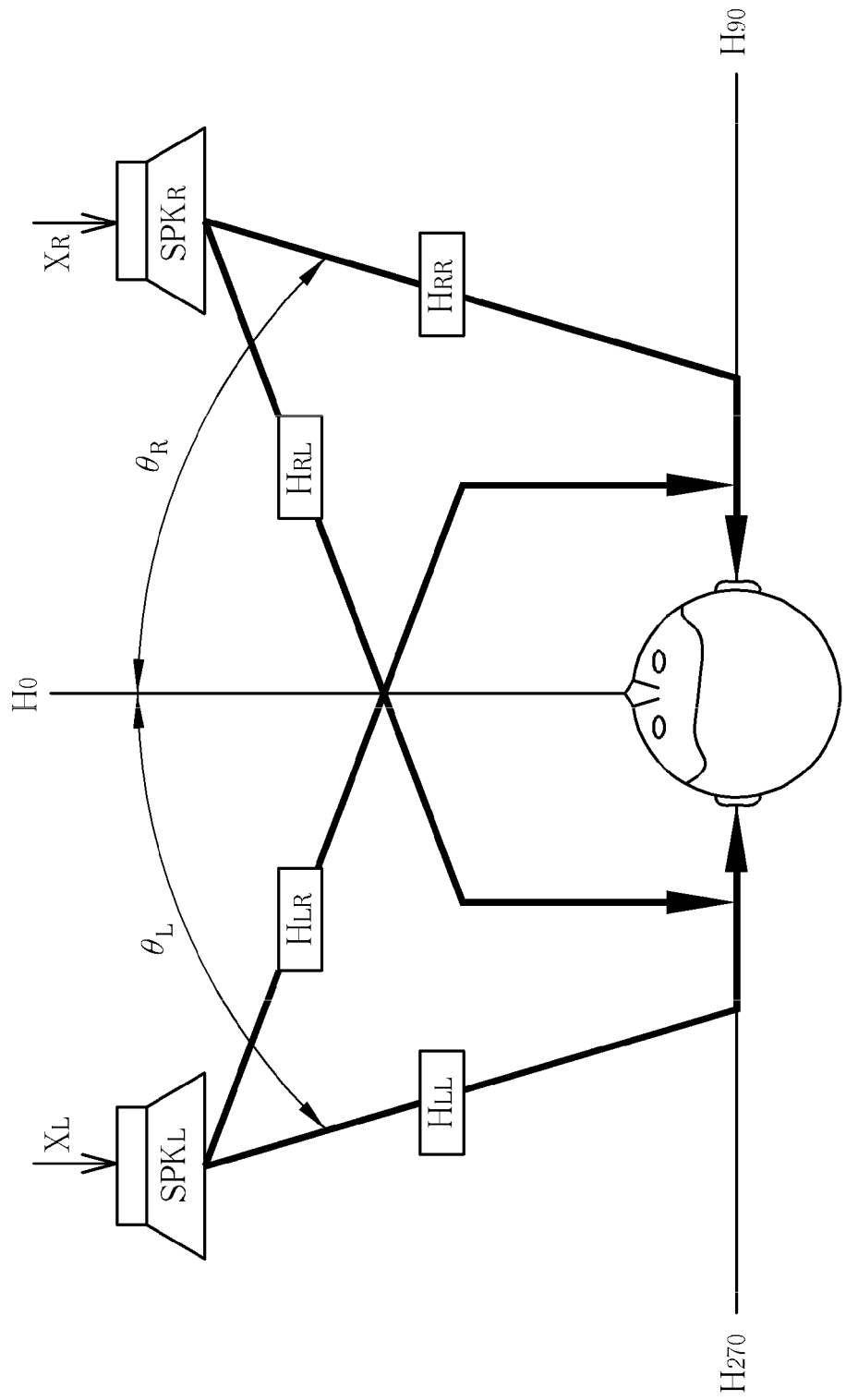
FIG. 12 is a diagram illustrating how the MVS algorithm works for presenting a surrounding sound effect to a user.

By way of example, but not limitation, the speaker system 1101 may be a two-channel speaker system, and the audio effect setting is a surrounding audio setting. A multi-view stereo (MVS) algorithm may be employed by the processing circuit 1114 to create a desired surrounding sound effect for the user. FIG. 12 is a diagram illustrating how the MVS algorithm works for presenting a surrounding sound effect to a user. As shown in the figure, a two-channel speaker system, including a left-channel speaker $SPK_L$ and a right-channel speaker $SPK_R$, is driven by a left-channel input $X_L$ and a right-channel input $X_R$ for presenting a surrounding sound effect to the user. It should be noted that the included angles $\theta_L$ and $\theta_R$ depend on the location of the user. In other words, parameters used by the MVS algorithm should be properly adjusted when user's location is changed. As shown in FIG. 12, the audio output of the left-channel speaker $SPK_L$ is allowed to arrive at user's left ear and right ear, and the transmission thereof may be modeled by the parameters $H_{LL}$ and $H_{LR}$. Similarly, the audio output of the right-channel speaker $SPK_R$ is allowed to arrive at user's right ear and left ear, and the transmission thereof may be modeled by the parameters $H_{RR}$ and $H_{RL}$. To present the surrounding sound effect to the user, the left-channel input $X_L$ and the right-channel input $X_R$ may be determined by using following formula.

$$\begin{bmatrix} X_L \\ X_R \end{bmatrix} = \begin{bmatrix} \frac{H_L}{H_{LL}} & -\left(\frac{H_{RL}}{H_{LL}}\right)\left(\frac{H_R}{H_{RR}}\right) \\ -\left(\frac{H_{LR}}{H_{RR}}\right)\left(\frac{H_L}{H_{LL}}\right) & \frac{H_R}{H_{RR}} \end{bmatrix} \begin{bmatrix} S_L \\ S_R \end{bmatrix} \quad (1)$$

In above formula (1), $S_L$ and $S_R$ represent the sound source, and parameters $H_L$ and $H_R$ depend on the position where the surrounding sound should be created for the user. Please note that $S_L=S_R$ if the sound source is a mono audio source; otherwise, $S_L$ and $S_R$ represent data of different audio channels. In the example shown in FIG. 12, the parameters $H_L$ and $H_R$ would have following relation: $H_L=H_R=H_{90}$. Considering a case where $\theta_L=\theta_R=30°$, the above-mentioned parameters $H_{LL}$, $H_{LR}$, $H_{RR}$, $H_{RL}$ would have following relation: $H_{RL}=H_{LR}=H_{330}$ and $H_{LL}=H_{RR}=H_{30}$. In a practical application, a look-up table may be built in advance, where the look-up table stores a plurality parameter value sets indexed by a plurality of user's face location/user's locations. For example, a parameter value set indexed by the user's location shown in FIG. 12 includes $H_{RL}=H_{330}$, $H_{LR}=H_{330}$, $H_{LL}=H_{30}$, and $H_{RR}=H_{30}$. Therefore, based on the detection result DR_P indicative of user's face location/user's location, the audio effect setting is automatically updated by reading the needed parameter value set from the pre-built look-up table.

In this exemplary implementation, the above-mentioned user status is user's face location/user's location. Therefore, the operation of the face detection module 1106 is identical to that of the face detection module 506/706 mentioned above. That is, the receiving interface 1102 further receives a captured image IMG generated from the image capturing device (e.g., a video camera) 218. For example, the image capturing device 218 and the speaker system 1101 may be disposed in the same display apparatus (e.g., a television). The face detection module 1106 therefore detects the user status (i.e., user's face location/user's location) by performing a face detection upon the captured image IMG.

When the detection result DR_P indicates that user's face location/user's location is changed, the processing circuit 1114 changes the audio effect setting correspondingly. To put it simply, when user's face corresponds to a first location and a first audio segment of the audio data $D_A$ is received by the receiving interface 1102, the audio playback module 1104 drives the speaker system 1101 to play the first audio segment according to a first audio effect setting, and when user's face corresponds to a second location (i.e., the user's face location/user's location is changed) and a second audio of the audio data $D_A$ is received by the receiving interface 1102, the audio playback module 1104 drives the speaker system 1101 to play the second audio segment according to a second audio effect setting which is different from the first audio effect setting. By way of example, but not limitation, the first audio effect setting is a first surrounding audio setting, and the second audio effect setting is a second surrounding audio setting. In one preferred implementation, the first surrounding audio setting and the second surrounding audio setting may correspond to different soundstage depths for offering the user with better listening experience. However, this is for illustrative purposes only, and is not meant to be a limitation of the present invention. The spirit of the present invention is obeyed as long as the playback of the multimedia content is automatically adjusted in response to the detection result which indicates a change of user's face location/user's location.

As mentioned above, the exemplary playback apparatus 1100 is capable of driving a two-channel speaker system to present the surrounding sound effect to the user. In a case where the playback apparatus 110 is used in a 3D video playback environment, the depth of field associated with the 3D video playback may be also considered by the processing circuit 1114. For example, the receiving interface 1102 further receives a depth of field parameter $P_D$ associated with playback of a 3D video data, and transmits the depth of field parameter $P_D$ to the processing circuit 1114. By way of example, but not limitation, the depth of field parameter $P_D$ may be set and provided by a user interface/man-machine interface. Thus, in addition to the detection result DR_P, the depth of field parameter $P_D$ is referenced for configuring the audio effect setting employed by the processing circuit 1114.

In above exemplary embodiments, the detecting block 106 shown in FIG. 1 is realized by a face detection module 206/506/706/1106. However, this is not meant to be a limitation of the present invention. Any technique capable of detecting the user status (e.g., user's face angle, user's face location, or user's location) may be employed. For example, when the user depresses a control key/button on a remote control, a control signal emitted from the remote control may be sensed to identify the location of the user. Besides, the video data included in the multimedia content DATA_IN may carry a 2D video content or a 3D video content, and/or the audio data included in the multimedia content DATA_IN may carry a single-channel audio content and a multi-channel audio content. Moreover, using a video effect setting which is not a zooming setting and/or using an audio effect setting which is not a surrounding audio setting are also feasible.

Those skilled in the art will readily observe that numerous modifications and alterations of the device and method may be made while retaining the teachings of the invention.

What is claimed is:

1. A playback method of a multimedia content, comprising:
   receiving the multimedia content;
   performing playback upon the multimedia content;
   detecting a user status and accordingly generating a detection result; and
   automatically adjusting the playback of the multimedia content when the detection result indicates a change of the user status.

2. The playback method of claim 1, wherein the step of detecting the user status comprises:
   receiving a captured image; and
   detecting the user status by performing a face detection upon the captured image.

3. The playback method of claim 1, wherein the user status is user's face angle.

4. The playback method of claim 3, wherein the multimedia content includes a plurality of video bitstreams corresponding to different view angles, respectively; the step of performing the playback upon the multimedia content comprises controlling a display screen to display frames of a first video bitstream corresponding to a first view angle; and the step of adjusting the playback of the multimedia content comprises: when the user's face angle is changed, controlling the display screen to display frames of a second video bitstream corresponding to a second view angle which is different from the first view angle.

5. The playback method of claim 1, wherein the user status is user's location.

6. The playback method of claim 5, wherein the multimedia content includes a plurality of video bitstreams corresponding to different view angles, respectively; the step of performing the playback upon the multimedia content comprises controlling a display screen to display frames of a first video bitstream corresponding to a first view angle; and the step of adjusting the playback of the multimedia content comprises: when the user's location is changed, controlling the display screen to display frames of a second video bitstream corresponding to a second view angle which is different from the first view angle.

7. The playback method of claim 5, wherein the multimedia content includes a video bitstream; the step of performing the playback upon the multimedia content comprises driving a display screen according to at least first frames of the video bitstream and a first video effect setting; and the step of adjusting the playback of the multimedia content comprises: when the user's location is changed, driving the display screen according to at least second frames of the video bitstream and a second video effect setting which is different from the first video effect setting.

8. The playback method of claim 7, wherein the step of driving the display screen according to at least the first frames of the video bitstream and the first video effect setting comprises: generating first processed frames by processing the first frames according to the first video effect setting, and driving the display screen according to the first processed frames; and the step of driving the display screen according to at least the second frames of the video bitstream and the second video effect setting comprises: generating second processed frames by processing the second frames according to the second video effect setting, and driving the display screen according to the second processed frames.

9. The playback method of claim 7, wherein the first video effect setting includes a first zooming setting, and the second video effect setting includes a second zooming setting.

10. The playback method of claim 7, wherein the step of driving the display screen according to at least the first frames of the video bitstream and the first video effect setting comprises:
    selecting a first partial image within each of the first frames according to a first indication value of the user's location;
    generating first processed images by processing first partial images of the first frames according to the first video effect setting; and
    driving the display screen according to the first processed images; and
    the step of driving the display screen according to at least the second frames of the video bitstream and the second video effect setting comprises:
    selecting a second partial image within each of the second frames according to a second indication value of the user's location, wherein the second indication value is different from the first indication value;
    generating second processed images by processing second partial images of the second frames according to the second video effect setting; and
    driving the display screen according to the second processed images.

11. The playback method of claim 5, wherein the multimedia content includes an audio data; the step of performing the playback upon the multimedia content comprises: when a first audio segment of the audio data is received, driving a speaker system to play the first audio segment according to a first audio effect setting;
    and the step of adjusting the playback of the multimedia content comprises: when the user's location is changed and a second audio segment of the audio data is received, driving the speaker system to play the second audio segment according to a second audio effect setting which is different from the first audio effect setting.

12. The playback method of claim 11, wherein the first audio effect setting is a first surrounding audio setting, and the second audio effect setting is a second surrounding audio setting.

13. The playback method of claim 11, wherein the first surrounding audio setting and the second surrounding audio setting correspond to different soundstage depths.

14. The playback method of claim 11, further comprising:
    receiving a depth of field parameter associated with playback of a three-dimensional (3D) video data;
    wherein the depth of field parameter is referenced for configuring at least one of the first audio effect setting and the second audio effect setting.

15. A playback apparatus of a multimedia content, comprising:
    a receiving block, for receiving the multimedia content;
    a playback block, coupled to the receiving block, for performing playback upon the multimedia content; and
    a detecting block, coupled to the playback block, for detecting a user status and accordingly generating a detection result;
    wherein the playback block automatically adjusts the playback of the multimedia content when the detection result indicates a change of the user status.

16. The playback apparatus of claim 15, wherein the receiving block further receives a captured image, and the detecting block detects the user status by performing a face detection upon the captured image.

17. The playback apparatus of claim 15, wherein the user status is user's face angle.

18. The playback apparatus of claim 17, wherein the multimedia content includes a plurality of video bitstreams corresponding to different view angles, respectively; and the playback block controls a display screen to display frames of a first video bitstream corresponding to a first view angle, and when the user's face angle is changed, controls the display screen to display frames of a second video bitstream corresponding to a second view angle which is different from the first view angle.

19. The playback apparatus of claim 15, wherein the user status is user's location.

20. The playback apparatus of claim 19, wherein the multimedia content includes a plurality of video bitstreams corresponding to different view angles, respectively; and the playback block controls a display screen to display frames of a first video bitstream corresponding to a first view angle, and when the user's location is changed, controls the display screen to display frames of a second video bitstream corresponding to a second view angle which is different from the first view angle.

21. The playback apparatus of claim 19, wherein the multimedia content includes a video bitstream; the playback block drives a display screen according to at least first frames of the video bitstream and a first video effect setting;

and when the user's location is changed, the playback block drives the display screen according to at least second frames of the video bitstream and a second video effect setting which is different from the first video effect setting.

22. The playback apparatus of claim 21, wherein the playback block generates first processed frames by processing the first frames according to the first video effect setting, and drives the display screen according to the first processed frames; and the playback block further generates second processed frames by processing the second frames according to the second video effect setting, and drives the display screen according to the second processed frames.

23. The playback apparatus of claim 21, wherein the first video effect setting includes a first zooming setting, and the second video effect setting includes a second zooming setting.

24. The playback apparatus of claim 21, wherein the playback block selects a first partial image within each of the first frames according to a first indication value of the user's location, generates first processed images by processing first partial images of the first frames according to the first video effect setting, and drives the display screen according to the first processed images; and the playback block further selects a second partial image within each of the second frames according to a second indication value of the user's location where the second indication value is different from the first indication value, generates second processed images by processing second partial images of the second frames according to the second video effect setting, and drives the display screen according to the second processed images.

25. The playback apparatus of claim 19, wherein the multimedia content includes an audio data; when a first audio segment of the audio data is received by the receiving block, the playback block drives a speaker system to play the first audio segment of the audio data according to a first audio effect setting; and when the user's location is changed and a second audio segment of the audio data is received by the receiving block, the playback block drives the speaker system to play the second audio segment according to a second audio effect setting which is different from the first audio effect setting.

26. The playback apparatus of claim 25, wherein the first audio effect setting is a first surrounding audio setting, and the second audio effect setting is a second surrounding audio setting.

27. The playback apparatus of claim 25, wherein the first surrounding audio setting and the second surrounding audio setting correspond to different soundstage depths.

28. The playback apparatus of claim 25, wherein the receiving block further receives a depth of field parameter associated with playback of a three-dimensional (3D) video data, and the depth of field parameter is referenced by the playback module for configuring at least one of the first audio effect setting and the second audio effect setting.

* * * * *